United States Patent
Tokumaru et al.

(10) Patent No.: US 9,905,375 B2
(45) Date of Patent: Feb. 27, 2018

(54) NONAQUEOUS ELECTROLYTIC SOLUTION FOR ELECTRIC DOUBLE LAYER CAPACITOR

(71) Applicant: OTSUKA CHEMICAL CO., LTD., Osaka (JP)

(72) Inventors: Yoshihisa Tokumaru, Tokushima (JP); Taiji Nakagawa, Tokushima (JP); Shoji Hiketa, Tokushima (JP); Koichi Sorajo, Tokushima (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 206 days.

(21) Appl. No.: 14/901,829

(22) PCT Filed: Jun. 3, 2014

(86) PCT No.: PCT/JP2014/064771
§ 371 (c)(1),
(2) Date: Dec. 29, 2015

(87) PCT Pub. No.: WO2015/001897
PCT Pub. Date: Jan. 8, 2015

(65) Prior Publication Data
US 2016/0372274 A1    Dec. 22, 2016

(30) Foreign Application Priority Data
Jul. 2, 2013    (JP) .................. 2013-138548

(51) Int. Cl.
*H01G 11/62* (2013.01)
*H01G 9/035* (2006.01)
*H01G 11/64* (2013.01)
*H01G 9/00* (2006.01)
*H01G 11/60* (2013.01)

(52) U.S. Cl.
CPC ............ *H01G 11/62* (2013.01); *H01G 9/035* (2013.01); *H01G 9/155* (2013.01); *H01G 11/60* (2013.01); *H01G 11/64* (2013.01); *Y02E 60/13* (2013.01)

(58) Field of Classification Search
CPC ........ H01G 9/035; H01G 9/155; H01G 11/62; H01G 11/64; H01G 11/60; Y02E 60/13
See application file for complete search history.

(56) References Cited

U.S. PATENT DOCUMENTS

| | | | |
|---|---|---|---|
| 7,436,651 B2 * | 10/2008 | Takeda | H01G 9/038 252/62.2 |
| 2007/0201185 A1 | 8/2007 | Yoshio et al. | |
| 2008/0089010 A1 | 4/2008 | Degen et al. | |
| 2008/0318135 A1 | 12/2008 | Sung et al. | |
| 2012/0171530 A1 * | 7/2012 | Lee | B60L 11/005 429/70 |

FOREIGN PATENT DOCUMENTS

| | | |
|---|---|---|
| JP | 63-215031 | 9/1988 |
| JP | 3-58526 | 9/1991 |
| JP | 8-31401 | 3/1996 |
| JP | 2001-148332 | 5/2001 |
| JP | 2007-73810 | 3/2007 |
| JP | 2008-508736 | 3/2008 |
| JP | 2008-205485 | 9/2008 |
| JP | 2008-210871 | 9/2008 |
| JP | 2008-243832 | 10/2008 |
| JP | 2011-159895 | 8/2011 |

OTHER PUBLICATIONS

International Preliminary Report on Patentability dated Jan. 14, 2016 in International (PCT) Application No. PCT/JP2014/064771.
Extended European Search Report dated Jun. 7, 2017 in corresponding European Application No. 14820373.0.
International Search Report dated Aug. 26, 2014 in International (PCT) Application No. PCT/JP2014/064771.

* cited by examiner

*Primary Examiner* — C Melissa Koslow
(74) *Attorney, Agent, or Firm* — Wenderoth, Lind & Ponack, L.L.P.

(57) ABSTRACT

Provided is a nonaqueous electrolytic solution that provides an electric double layer capacitor having excellent durability. The nonaqueous electrolytic solution is prepared by dissolving a quaternary ammonium salt as an electrolyte in a nonaqueous solvent, and the nonaqueous electrolytic solution comprises a diethylpyrrolidinium salt and/or a 1-ethyl-1,3-dimethylpyrrolidinium salt.

7 Claims, No Drawings

NONAQUEOUS ELECTROLYTIC SOLUTION FOR ELECTRIC DOUBLE LAYER CAPACITOR

TECHNICAL FIELD

The present invention relates to a nonaqueous electrolytic solution for an electric double layer capacitor and to an electric double layer capacitor.

BACKGROUND ART

Electric double layer capacitors (EDLCs) are power storage devices that store electric power by using a phenomenon in which ions in an electrolytic solution form an electric double layer due to physical adsorption to an electrode when an electric field is applied to the electrolytic solution. As compared with secondary batteries such as lithium-ion batteries that generate electricity by a chemical reaction, the EDLCs have a higher charging and discharging speed and thus are widely used in uninterruptible power supply systems (UPSs), for example. In recent years, social demands for environmental consciousness and energy efficiency have become more severe, and EDLCs with the above-mentioned properties have been more widely, increasingly demanded as temporary electric power storage apparatuses for energy recovery and use of the energy as auxiliary electric power in automobiles and the like and for wind power energy, and as electric power supplies for copy machines or similar machines to return from a standby condition. For the reasons, EDLCs are one of the most attractive power storage devices.

In recent years, electrochemical devices including batteries and capacitors are required to have much higher output density and energy density, and organic electrolytic solutions (nonaqueous electrolytic solutions) have been more widely used than aqueous electrolytic solutions from the viewpoint of voltage endurance.

Examples of known and widely used organic electrolytic solutions include an electrolytic solution prepared by dissolving a solid ammonium salt (electrolyte) such as a linear aliphatic ammonium salt for example, a tetraethylammonium salt and a triethylmethylammonium salt in an organic solvent such as propylene carbonate (Patent Literature 1); and electrolytic solutions prepared by dissolving a cyclic aliphatic ammonium salt such as an N-ethyl-N-methyl pyrrolidinium salt (Patent Literature 2) or a spiro-(1,1)-bipiperidinium salt (Patent Literature 3) in an organic solvent such as propylene carbonate. However, the electrolytic solutions have insufficient durability when used in electric double layer capacitors. One of the reasons for the insufficient durability is decomposition of a carbonate solvent used as the solvent. When the carbonate solvent is decomposed, carbon monoxide or carbon dioxide is generated and reacts with the electrolyte. The reaction products presumably further cause complicated decomposition reactions, deteriorating the performance of the electrolytic solution, for example.

CITATION LIST

Patent Literature

Patent Literature 1: JP 03-58526 B
Patent Literature 2: JP 08-31401 B
Patent Literature 3: JP 2008-210871 A

SUMMARY OF INVENTION

Technical Problem

In view of the above circumstances, an object of the present invention is to provide a nonaqueous electrolytic solution that provides an electric double layer capacitor having excellent durability.

Solution to Problem

As a result of intensive studies to develop an electrolyte and an electrolytic solution for electric double layer capacitors capable of solving the problem, the inventors of the present invention have found that an electric double layer capacitor produced using a nonaqueous electrolytic solution containing an ethylmethylpyrrolidinium salt represented by General Formula (I) and further containing a diethylpyrrolidinium salt represented by General Formula (II-1) and/or a 1-ethyl-1,3-dimethylpyrrolidinium salt represented by General Formula (II-2) has excellent durability.

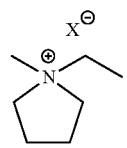

(I)

In General Formula (I), $X^-$ represents a counter ion selected from the group consisting of $PF_6^-$, $BF_4^-$, $AsF_6^-$, $N(CF_3SO_3)_2^-$, $N(FSO_3)_2^-$, $SbF_6^-$, and $RfSO_3$ (Rf is a fluoroalkyl group having 1 to 8 carbon atoms).

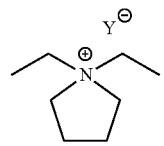

(II-1)

In General Formula (II-1), $Y^-$ represents a counter ion selected from the group consisting of $PF_6^-$, $BF_4^-$, $AsF_6^-$, $N(CF_3SO_3)_2^-$, $N(FSO_3)_2^-$, $SbF_6^-$, and $RfSO_3^-$ (Rf is a fluoroalkyl group having 1 to 8 carbon atoms) and may be the same as or different from the counter ion ($X^-$) contained in General Formula (I)

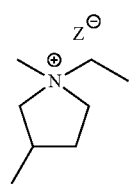

(II-2)

In General Formula (II-2), $Z^-$ represents a counter ion selected from the group consisting of $PF_6^-$, $BF_4^-$, $AsF_6^-$, $N(CF_3SO_3)_2^-$, $N(FSO_3)_2^-$, $SbF_6^-$, and $RfSO_3^-$ (Rf is a fluoroalkyl group having 1 to 8 carbon atoms) and may be the same as or different from the counter ion ($X^-$) contained in General Formula (I).

That is, the present invention encompasses the following aspects.

(1) A nonaqueous electrolytic solution prepared by dissolving a quaternary ammonium salt represented by General Formula (I):

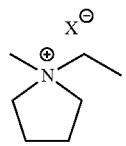

(I)

(wherein X⁻ represents a counter ion selected from the group consisting of PF₆⁻, BF₄⁻, AsF₆⁻, N(CF₃SO₃)₂⁻, N(FSO₃)₂⁻, SbF₆⁻, and RfSO₃ (Rf is a fluoroalkyl group having 1 to 8 carbon atoms)) as an electrolyte in a nonaqueous solvent, the nonaqueous electrolytic solution comprising:

a diethylpyrrolidinium salt represented by General Formula (II-1):

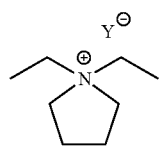

(II-1)

(wherein Y⁻ represents a counter ion selected from the group consisting of PF₆⁻, BF₄⁻, AsF₆⁻, N(CF₃SO₃)₂⁻, N(FSO₃)₂⁻, SbF₆⁻, and RfSO₃⁻ (Rf is a fluoroalkyl group having 1 to 8 carbon atoms) and may be the same as or different from the counter ion (X⁻) contained in General Formula (I)); and/or a 1-ethyl-1,3-dimethylpyrrolidinium salt represented by General Formula (II-2):

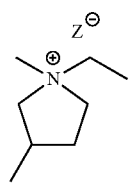

(II-2)

(wherein Z⁻ represents a counter ion selected from the group consisting of PF₆⁻, BF₄⁻, AsF₆⁻, N(CF₃SO₃)₂⁻, N(FSO₃)₂⁻, SbF₆⁻, and RfSO₃⁻ (Rf is a fluoroalkyl group having 1 to 8 carbon atoms) and may be the same as or different from the counter ion (X⁻) contained in General Formula (I)).

(2) The nonaqueous electrolytic solution according to the above (1), comprising the diethylpyrrolidinium salt represented by General Formula (II-1) and/or the 1-ethyl-1,3-dimethylpyrrolidinium salt represented by General Formula (II-2) at a concentration of 0.1 ppm to 30,000 ppm.

(3) The nonaqueous electrolytic solution according to the above (1), comprising the diethylpyrrolidinium salt represented by General Formula (II-1) and/or the 1-ethyl-1,3-dimethylpyrrolidinium salt represented by General Formula (II-2) at a concentration of 1 ppm to 20,000 ppm.

(4) The nonaqueous electrolytic solution according to the above (1), comprising the diethylpyrrolidinium salt represented by General Formula (II-1) and/or the 1-ethyl-1,3-dimethylpyrrolidinium salt represented by General Formula (II-2) at a concentration of 10 ppm to 15,000 ppm.

(5) The nonaqueous electrolytic solution according to the above (1), wherein the nonaqueous electrolytic solution comprises the diethylpyrrolidinium salt represented by General Formula (II-1) and/or the 1-ethyl-1,3-dimethylpyrrolidinium salt represented by General Formula (II-2) at a concentration of 50 ppm to 10,000 ppm.

(6) The nonaqueous electrolytic solution according to any one of the above (1) to (5), wherein the counter ion (X⁻) of the quaternary ammonium salt represented by General Formula (I) is a fluoroborate ion (BF₄⁻).

(7) The nonaqueous electrolytic solution according to any one of the above (1) to (6), wherein the nonaqueous solvent is at least one solvent selected from the group consisting of propylene carbonate, ethylene carbonate, butylene carbonate, sulfolane, methylsulfolane, dimethyl carbonate, ethyl methyl carbonate, and diethyl carbonate.

(8) An electric double layer capacitor comprising the nonaqueous electrolytic solution according to any one of the above (1) to (7) as an electrolytic solution.

Advantageous Effects of Invention

Using the nonaqueous electrolytic solution of the present invention, a highly durable electric double layer capacitor that exhibits less capacity decrease (capacity reduction) and less resistance increase over a long period of time can be produced.

DESCRIPTION OF EMBODIMENTS

The present invention will now be described in detail.

The nonaqueous electrolytic solution of the present invention is a nonaqueous electrolytic solution prepared by dissolving a quaternary ammonium salt represented by General Formula (I) as an electrolyte in a nonaqueous solvent. The nonaqueous electrolytic solution of the present invention comprises a diethylpyrrolidinium salt represented by General Formula (II-1) and/or a 1-ethyl-1,3-dimethylpyrrolidinium salt represented by General Formula (II-2).

In the present specification, the quaternary ammonium salt represented by General Formula (I) is also called ethylmethylpyrrolidinium salt (I). The diethylpyrrolidinium salt represented by General Formula (II-1) and the 1-ethyl-1,3-dimethylpyrrolidinium salt represented by General Formula (II-2) are also called diethylpyrrolidinium salt (II-1) and 1-ethyl-1,3-dimethylpyrrolidinium salt (II-2), respectively.

The diethylpyrrolidinium salt (II-1) and the 1-ethyl-1,3-dimethylpyrrolidinium salt (II-2) are used in order to improve the durability of an electric double layer capacitor. The diethylpyrrolidinium salt (II-1) and/or the 1-ethyl-1,3-dimethylpyrrolidinium salt (II-2) contained in the nonaqueous electrolytic solution together with the ethylmethylpyrrolidinium salt (I) and the nonaqueous solvent can effectively control the capacity decrease and the resistance increase of an electric double layer capacitor produced using the nonaqueous electrolytic solution and can improve the durability of the electric double layer capacitor. In the nonaqueous electrolytic solution, the upper limit of the concentration of the diethylpyrrolidinium salt (II-1) and/or the 1-ethyl-1,3-dimethylpyrrolidinium salt (II-2) is preferably about 30,000 ppm, more preferably about 20,000 ppm, even more preferably about 15,000 ppm, particularly preferably about 10,000 ppm, and most preferably about 6,000 ppm. In the nonaqueous electrolytic solution, the lower limit of the concentration of the diethylpyrrolidinium salt (II-1) and/or the 1-ethyl-1,3-dimethylpyrrolidinium salt (II-2) is preferably about 0.1 ppm, more preferably about 1 ppm, even more preferably about 10 ppm, and particularly preferably about 50 ppm.

The nonaqueous electrolytic solution of the present invention comprises the diethylpyrrolidinium salt (II-1) and/or the 1-ethyl-1,3-dimethylpyrrolidinium salt (II-2) at a concentration of preferably 0.1 ppm to 30,000 ppm, more preferably 1 ppm to 20,000 ppm, even more preferably 10 ppm to 15,000 ppm, and particularly preferably 50 ppm to 10,000 ppm.

When a nonaqueous electrolytic solution comprises the diethylpyrrolidinium salt (II-1) and/or the 1-ethyl-1,3-dimethylpyrrolidinium salt (II-2), an electric double layer capacitor produced using the nonaqueous electrolytic solution has excellent durability.

The reason of the improved durability of the electric double layer capacitor produced using the nonaqueous electrolytic solution containing the diethylpyrrolidinium salt (II-1) and/or the 1-ethyl-1,3-dimethylpyrrolidinium salt (II-2) is unclear, but these substances presumably form an SEI film on the electrode to suppress the decomposition of the electrolytic solution.

In the present invention, the ethylmethylpyrrolidinium salt represented by General Formula (I) is typically used as the electrolyte. The counter ion (anion) ($X^-$) in General Formula (I) is preferably a fluoroborate ion ($BF_4^-$).

The concentration of the ethylmethylpyrrolidinium salt (I) in the nonaqueous electrolytic solution is preferably about 0.1 to 3 mol/L and particularly preferably about 0.5 to 1.5 mol/L. When the concentration of the ethylmethylpyrrolidinium salt (I) is within this range, the nonaqueous electrolytic solution has high conductivity, and thus such a range is preferred. In addition, when the electrolyte concentration is within such a range, the increase in internal resistance of an electric double layer capacitor produced using the nonaqueous electrolytic solution can be more effectively controlled. Furthermore, when the electrolyte concentration is within such a range, salt precipitation in the nonaqueous electrolytic solution does not occur even at low temperatures, and thus such a range is preferred.

In the diethylpyrrolidinium salt represented by General Formula (II-1), the counter ion (anion) ($Y^-$) may be the same as or different from the counter ion ($X^-$) contained in General Formula (I). The counter ion ($Y^-$) is preferably a fluoroborate ion ($BF_4^-$). The diethylpyrrolidinium salt represented by General Formula (II-1) is preferably diethylpyrrolidinium tetrafluoroborate.

In the 1-ethyl-1,3-dimethylpyrrolidinium salt represented by General Formula (II-2), the counter ion (anion) ($Z^-$) may be the same as or different from the counter ion ($X^-$) contained in General Formula (I). The counter ion ($Z^-$) in the General Formula (II-2) is preferably a fluoroborate ion ($BF_4^-$). The 1-ethyl-1,3-dimethylpyrrolidinium salt represented by General Formula (II-2) is preferably 1-ethyl-1,3-dimethylpyrrolidinium tetrafluoroborate.

When the nonaqueous electrolytic solution comprises the ethylmethylpyrrolidinium salt (I), the diethylpyrrolidinium salt (II-1), and the 1-ethyl-1,3-dimethylpyrrolidinium salt (II-2), the counter ion ($X^-$) in the General Formula (I), the counter ion ($Y^-$) in General Formula (II-1), and the counter ion ($Z^-$) in General Formula (II-2) may be all the same or different.

Each of the ethylmethylpyrrolidinium salt (I), the diethylpyrrolidinium salt (II-1), and the 1-ethyl-1,3-dimethylpyrrolidinium salt (II-2) may be a commercially available compound. Also, the compounds can be produced by the method described in JP 08-31401 B, for example.

The nonaqueous solvent used in the electrolytic solution is not particularly limited and is exemplified by ethylene carbonate, propylene carbonate, butylene carbonate, ethyl methyl carbonate, dimethyl carbonate, diethyl carbonate, γ-butyrolactone, acetonitrile, sulfolane, and methylsulfolane. These solvents may be used alone or as a mixture of two or more thereof. The nonaqueous solvent is preferably at least one solvent selected from the group consisting of propylene carbonate, ethylene carbonate, butylene carbonate, sulfolane, methylsulfolane, dimethyl carbonate, ethyl methyl carbonate, and diethyl carbonate. The nonaqueous solvent is particularly preferably propylene carbonate. As the nonaqueous solvent, a commercially available solvent may be used as it is or after further purified by distillation or another method as necessary.

The method for producing the nonaqueous electrolytic solution comprising the diethylpyrrolidinium salt (II-1) and/or the 1-ethyl-1,3-dimethylpyrrolidinium salt (II-2) is not particularly limited. Also, the method for controlling the concentration of the diethylpyrrolidinium salt (II-1) and/or the 1-ethyl-1,3-dimethylpyrrolidinium salt (II-2) in the nonaqueous electrolytic solution is not particularly limited. For example, by adjusting the amount of diethylpyrrolidinium salt (II-1) and/or the 1-ethyl-1,3-dimethylpyrrolidinium salt (II-2) in the electrolyte (the ethylmethylpyrrolidinium salt (I)) as the raw material of the nonaqueous electrolytic solution, the content of these compounds in the resulting nonaqueous electrolytic solution can be adjusted. Alternatively, the diethylpyrrolidinium salt (II-1) and/or the 1-ethyl-1,3-dimethylpyrrolidinium salt (II-2) may be separately added to a nonaqueous electrolytic solution. For example, when the electrolyte (namely, the ethylmethylpyrrolidinium salt (I)) as the raw material of the nonaqueous electrolytic solution comprises the diethylpyrrolidinium salt (II-1) or the 1-ethyl-1,3-dimethylpyrrolidinium salt (II-2) at a high content, the content of such a compound in the nonaqueous electrolytic solution can be adjusted by the following method, for example. More specifically, for example, when a nonaqueous electrolytic solution that is prepared by dissolving the ethylmethylpyrrolidinium salt (I) as the electrolyte in the nonaqueous solvent so as to give a concentration of about 0.5 to 1.5 mol/L comprises the diethylpyrrolidinium salt (II-1) and/or the 1-ethyl-1,3-dimethylpyrrolidinium salt (II-2) at a concentration of more than 30,000 ppm, a solvent having high solubility of the diethylpyrrolidinium salt (II-1) and/or the 1-ethyl-1,3-dimethylpyrrolidinium salt (II-2) is used to recrystallize the electrolyte. Subsequent filtration can remove an appropriate amount of the diethylpyrrolidinium salt (II-1) and/or the 1-ethyl-1,3-dimethylpyrrolidinium salt (II-2). The purified electrolyte is then dissolved in the nonaqueous solvent. In this way, the solvent used for the crystallization is removed and as a result a nonaqueous electrolytic solution comprising a reduced amount of the diethylpyrrolidinium salt (II-1) and/or the 1-ethyl-1,3-dimethylpyrrolidinium salt (II-2) can be obtained. The content of the diethylpyrrolidinium salt (II-1) and the 1-ethyl-1,3-dimethylpyrrolidinium salt (II-2) controlled by this operation typically depends on the solvent used for the crystallization and the crystallization temperature. For example, the electrolyte is dissolved in butanol at about 60 to 105° C. and then subjected to recrystallization; and the crystal is collected by filtration and then is dissolved again in a nonaqueous solvent to remove the crystallization solvent. By this operation, the content of the diethylpyrrolidinium salt (II-1) and/or the 1-ethyl-1,3-dimethylpyrrolidinium salt (II-2) can be controlled to achieve about 0.1 ppm to 30,000 ppm in the nonaqueous electrolytic solution. When the nonaqueous electrolytic solution comprises the diethylpyrrolidinium salt (II-1) and/or the 1-ethyl-1,3-dimethylpyrrolidinium salt (II-2) at about less than 0.1 ppm, the diethylpyrrolidinium salt (II-1) and/or the 1-ethyl-1,3-dimethylpyrrolidinium salt (II-1) can be added to adjust the concentration to an appropriate value.

The concentration of the diethylpyrrolidinium salt (II-1) and the 1-ethyl-1,3-dimethylpyrrolidinium salt (II-2) contained in the nonaqueous electrolytic solution can be determined by a known method such as ion chromatography. For example, when the concentration is determined by ion chromatography, the conditions described in Examples may be employed.

The electrolytic solution of the present invention may comprise one or more components in addition to the ethylmethylpyrrolidinium salt (I), the ethyl pyrrolidinium salt (II-1), and the 1-ethyl-1,3-dimethylpyrrolidinium salt (II-2) as long as the advantageous effects of the invention are achieved.

An electric double layer capacitor comprising the nonaqueous electrolytic solution as an electrolytic solution is also encompassed in the present invention.

The electric double layer capacitor of the present invention can be any electric double layer capacitor that comprises the nonaqueous electrolytic solution as the electrolytic solution, and the production method therefor and the like are not particularly limited. The electric double layer capacitor of the present invention comprising the nonaqueous electrolytic solution is a highly durable electric double layer capacitor that exhibits less capacity decrease (capacity reduction) and less resistance increase.

EXAMPLES

The present invention will next be described in further detail with reference to Examples, but the invention is not limited to these Examples.

The concentration of a diethylpyrrolidinium salt in each nonaqueous electrolytic solution (hereinafter simply called electrolytic solution) prepared in Examples 1 to 5 and Comparative Example 1 and properties of the electric double layer capacitors produced using the electrolytic solutions were determined by the following methods.

Quantitative Determination of Diethylpyrrolidinium Salt:
  Measurement was carried out by ion chromatography.
Column: Dionex Ion Pac CS14, ø4×250 mm (Nippon Dionex)
Detection method: electric conductivity
Suppressor: CSRS300 (product name, Nippon Dionex)
Suppressor current value: 35 mA
Mobile phase: 0.010 M methanesulfonic acid solution
Regeneration solution: ultrapure water (2 mL/min)
Mobile phase flow rate: 1.0 mL/min
Column temperature: 30° C.
Cell temperature: 35° C.
Sample injection volume: 25 mL
  Sample Preparation Method:
  Preparation method of reference standard (solution at about 10 ppm): About 16.8 mg of diethylpyrrolidinium tetrafluoroborate was accurately weighed and dissolved in ultrapure water to give a 100-mL solution. From the solution, 5 mL was taken out and was diluted with ultrapure water to give a 50-mL solution.

Sample solution: About 500 mg of a sample was diluted with ultrapure water to give a 50-mL solution.

Measurement method: The reference standard and the sample solutions were analyzed. From the obtained peaks, the contents were calculated in accordance with the following calculation expression.

Diethylpyrrolidinium salt content (ppm)=peak area of diethylpyrrolidinium salt in sample solution× 0.01 (mg/mL)×50 (mL)/sample amount (mg)/ peak area of $K^+$ in standard solution×1,000,000 (ppm)

Properties of Electric Double Layer Capacitor
(Method for Producing Capacitor)

A device (3 cm×5 cm: 5 pieces were stacked) was produced using the following materials and was subjected to vacuum drying at 180° C. for 15 hours. The device was then impregnated with an electrolytic solution (electrolytic solution amount: 0.097 cc/F), yielding a laminate cell (electric double layer capacitor). The produced electric double layer capacitor was subjected to aging treatment for 24 hours while a voltage of 2.7 V was applied to the capacitor at room temperature, and the respective initial properties were determined.

Electrode: a sheet electrode purchased from Japan Gore-Tex
Electrolytic paper (separator): TF4050 manufactured by Nippon Kodoshi
Electrolytic solution: the electrolytic solutions prepared in Examples 1 to 5 and Comparative Example 1

The initial capacity and the internal resistance of the electric double layer capacitor were determined with an applied voltage of 2.7 V. After storage at 60° C. for 2,000 hours with an applied voltage of 2.7 V, the capacity was determined, and the capacity reduction rate relative to the initial capacity was calculated. The internal resistance was determined by an alternating-current two-terminal method at a frequency of 1 kHz.

The method for preparing each electrolytic solution of Examples 1 to 5 and Comparative Example 1 was as described below. The propylene carbonate used in Examples and Comparative Example was a superfractionated, highly pure propylene carbonate (purity: 99.99%, analyzed by GC).

Comparative Example 1

An electrolytic solution was prepared by dissolving, at room temperature, in a dry nitrogen atmosphere with a dew point of −40° C., N-ethyl-N-methyl pyrrolidinium tetrafluoroborate as the electrolyte in a highly pure propylene carbonate so as to give a concentration of 1.5 mol/L. Diethylpyrrolidinium tetrafluoroborate was not detected (undetectable) in the electrolytic solution. Table 1 shows the properties of the electric double layer capacitor produced using the electrolytic solution.

Examples 1 to 5

To the electrolytic solution prepared in Comparative Example 1, diethylpyrrolidinium tetrafluoroborate was uniformly dissolved, giving electrolytic solutions containing diethylpyrrolidinium tetrafluoroborate at corresponding concentrations shown in Table 1. Table 1 shows the properties of the electric double layer capacitors produced using the respective electrolytic solutions.

TABLE 1

Initial properties and durability test results of capacitors produced using electrolytic solutions

| | Diethyl-pyrrolidinium tetrafluoro-borate concentration (ppm) | Properties of electric double layer capacitor | | | |
|---|---|---|---|---|---|
| | | Initial capacity (F) | Initial resistance (m · Ω) | Capacity reduction rate (%) | Resistance change rate (%) |
| Example 1 | 1010 | 18.2 | 32.6 | −9.0 | 100 |
| Example 2 | 5035 | 18.1 | 32.7 | −8.7 | 101 |
| Example 3 | 10000 | 18.1 | 32.7 | −8.7 | 100 |
| Example 4 | 98 | 18.1 | 32.5 | −8.9 | 103 |
| Example 5 | 20150 | 17.6 | 34.0 | −14.8 | 120 |
| Comparative Example 1 | N.D. | 18.2 | 32.5 | −15.5 | 147 |

The solvent used was propylene carbonate (PC).
The concentration of diethylpyrrolidinium tetrafluoroborate was determined by ion chromatography.

The results shown in Table 1 indicate that the electric double layer capacitors produced using the respective electrolytic solutions comprising the diethylpyrrolidinium salt in Examples 1 to 5 were highly durable and exhibited less capacity decrease (capacity reduction) and less resistance increase as compared with the electric double layer capacitor produced using the electrolytic solution comprising no diethylpyrrolidinium salt in Comparative Example 1.

The concentration of the 1-ethyl-1,3-dimethylpyrrolidinium salt in each electrolytic solution prepared in Examples 6 to 9 and Comparative Example 2 and properties of the electric double layer capacitors produced using the electrolytic solutions were determined by the following methods.

Quantitative Determination of 1-ethyl-1,3-dimethylpyrrolidinium salt:

Measurement was carried out by ion chromatography. The apparatus and measurement conditions used for the measurement were the same as the apparatus and the conditions in the above quantitative determination of the diethylpyrrolidinium salt.

Sample Preparation Method:

Preparation method of reference standard (solution at about 10 ppm): About 16.8 mg of 1-ethyl-1,3-dimethylpyrrolidinium tetrafluoroborate was accurately weighed and dissolved in ultrapure water to give a 100-mL solution in a volumetric flask. From the solution, 5 mL was taken out and was diluted with ultrapure water to give a 50-mL solution in a volumetric flask.

Sample solution: About 500 mg of a sample was dissolved in ultrapure water to give a 50-mL solution in a volumetric flask.

Measurement method: The reference standard and the sample solutions were analyzed. From the obtained peaks, the contents were calculated in accordance with the following calculation expression.

1-Ethyl-1,3-dimethylpyrrolidinium content (ppm)=
peak area of 1-ethyl-1,3-dimethylpyrrolidinium salt in sample solution×0.01 (mg/mL)×50 (mL)/sample amount (mg)/peak area of $K^+$ in standard solution×1,000,000 (ppm)

Properties of Electric Double Layer Capacitor

Electric double layer capacitors were produced and evaluated in the same manner as in the above except that the respective electrolytic solutions prepared in Examples 6 to 9 and Comparative Example 2 were used as the electrolytic solution.

Comparative Example 2

An electrolytic solution was prepared by dissolving, at room temperature, in a dry nitrogen atmosphere with a dew point of −40° C., 1-ethyl-1-methyl pyrrolidinium tetrafluoroborate as the electrolyte in a highly pure propylene carbonate so as to give a concentration of 1.5 mol/L. Diethylpyrrolidinium tetrafluoroborate was not detected (undetectable) in the electrolytic solution. Table 2 shows the properties of the electric double layer capacitor produced using the electrolytic solution.

Examples 6 to 9

To the electrolytic solution prepared in Comparative Example 2, 1-ethyl-1,3-dimethylpyrrolidinium tetrafluoroborate was uniformly dissolved, giving electrolytic solutions containing 1-ethyl-1,3-dimethylpyrrolidinium tetrafluoroborate at corresponding concentrations shown in Table 2. Table 2 shows the properties of the electric double layer capacitors produced using the respective electrolytic solutions.

TABLE 2

Initial properties and durability test results of capacitors produced by using electrolytic solutions

| | 1-Ethyl-1,3-dimethyl pyrrolidinium tetrafluoro-borate concentration (ppm) | Properties of electric double layer capacitor | | | |
|---|---|---|---|---|---|
| | | Initial capacity (F) | Initial resistance (m · Ω) | Capacity reduction rate (%) | Resistance change rate (%) |
| Example 6 | 1050 | 18.2 | 32.5 | −9.0 | 100 |
| Example 7 | 5200 | 18.1 | 32.4 | −9.1 | 101 |
| Example 8 | 105 | 18.1 | 32.5 | −8.8 | 103 |
| Example 9 | 20060 | 17.7 | 34.0 | −14.3 | 125 |
| Comparative Example 2 | N.D. | 18.1 | 32.5 | −15.1 | 150 |

The solvent used was propylene carbonate (PC).
The concentration of 1-ethyl-1,3-dimethylpyrrolidinium tetrafluoroborate was determined by ion chromatography.

The results shown in Table 2 indicate that the electric double layer capacitors produced using the respective electrolytic solutions comprising the 1-ethyl-1,3-dimethylpyrrolidinium salt in Examples 6 to 9 were highly durable and exhibited less capacity decrease (capacity reduction) and less resistance increase as compared with the electric double layer capacitor produced using the electrolytic solution comprising no 1-ethyl-1,3-dimethylpyrrolidinium salt in Comparative Example 2.

The invention claimed is:

1. A nonaqueous electrolytic solution prepared by dissolving a quaternary ammonium salt of Formula (I):

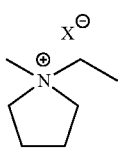

(I)

wherein X⁻ is a counter ion selected from the group consisting of $PF_6^-$, $BF_4^-$, $AsF_6^-$, $N(CF_3SO_3)_2^-$, $N(FSO_3)_2^-$, $SbF_6^-$, and $RfSO_3$, and Rf is a fluoroalkyl group having 1 to 8 carbon atoms, as an electrolyte in a nonaqueous solvent, wherein the nonaqueous electrolytic solution comprises:
    a diethylpyrrolidinium salt of Formula (II-1):

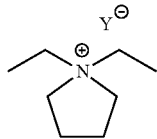

(II-1)

wherein Y⁻ is a counter ion selected from the group consisting of $PF_6^-$, $BF_4^-$, $AsF_6^-$, $N(CF_3SO_3)_2^-$, $N(FSO_3)_2^-$, $SbF_6^-$, and $RfSO_3^-$, and Rf is a fluoroalkyl group having 1 to 8 carbon atoms and may be the same as or different from the counter ion (X⁻) contained in the Formula (I); and/or
    a 1-ethyl-1,3-dimethylpyrrolidinium salt of Formula (II-2):

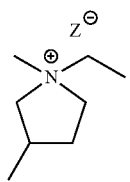

(II-2)

wherein Z⁻ is a counter ion selected from the group consisting of $PF_6^-$, $BF_4^-$, $AsF_6^-$, $N(CF_3SO_3)_2^-$, $N(FSO_3)_2^-$, $SbF_6^-$, and $RfSO_3^-$, and Rf is a fluoroalkyl group having 1 to 8 carbon atoms and may be the same as or different from the counter ion (X⁻) contained in the Formula (I), and
    wherein the nonaqueous electrolytic solution comprises the diethylpyrrolidinium salt of Formula (II-1) and/or the 1-ethyl-1,3-dimethylpyrrolidinium salt of Formula (II-2) at a concentration of 0.1 ppm to 30,000 ppm.

2. The nonaqueous electrolytic solution according to claim 1, comprising the diethylpyrrolidinium salt of Formula (II-1) and/or the 1-ethyl-1,3-dimethylpyrrolidinium salt of Formula (II-2) at a concentration of 1 ppm to 20,000 ppm.

3. The nonaqueous electrolytic solution according to claim 1, comprising the diethylpyrrolidinium salt of Formula (II-1) and/or the 1-ethyl-1,3-dimethylpyrrolidinium salt of Formula (II-2) at a concentration of 10 ppm to 15,000 ppm.

4. The nonaqueous electrolytic solution according to claim 1, comprising the diethylpyrrolidinium salt of Formula (II-1) and/or the 1-ethyl-1,3-dimethylpyrrolidinium salt of Formula (II-2) at a concentration of 50 ppm to 10,000 ppm.

5. The nonaqueous electrolytic solution according to claim 1, 2, 3 or 4, wherein the counter ion (X⁻) of the quaternary ammonium salt of Formula (I) is a fluoroborate ion ($BF_4^-$).

6. The nonaqueous electrolytic solution according to claim 1, wherein the nonaqueous solvent is at least one solvent selected from the group consisting of propylene carbonate, ethylene carbonate, butylene carbonate, sulfolane, methylsulfolane, dimethyl carbonate, ethyl methyl carbonate, and diethyl carbonate.

7. An electric double layer capacitor comprising the nonaqueous electrolytic solution according to claim 1 as an electrolytic solution.

* * * * *